United States Patent [19]

Beier et al.

[11] Patent Number: 4,479,137

[45] Date of Patent: Oct. 23, 1984

[54] DAMPING MEANS FOR DRAWING HEADS

[76] Inventors: Lothar Beier, 22, Fritz-Ritter-Str., Jena-Lobeda, District of Gera; Arnold Zemann, 4, Dr.-Hufeland-Str., Stadtroda, District of Gera; Helmut Wächter, 44, Rodaer Str., Neustadt/Orla, District of Gera, all of German Democratic Rep.

[21] Appl. No.: 281,551

[22] Filed: Jul. 13, 1981

[30] Foreign Application Priority Data

Oct. 1, 1980 [DD] German Democratic Rep. .... 224253

[51] Int. Cl.³ .......... G01D 15/20

[52] U.S. Cl. .......... 346/141; 346/139 C

[58] Field of Search .......... 346/141, 139 C

[56] References Cited

U.S. PATENT DOCUMENTS 4,054,883 10/1977 Ozone .......... 346/141 X
4,157,552 6/1979 Nakajima .......... 346/141
4,295,146 10/1981 Cordes .......... 346/141 X

*Primary Examiner*—George H. Miller, Jr.

[57] ABSTRACT

The invention relates to a damping means particularly for drawing heads for use in map-plotting and the like. The vertical movement of a drawing instrument of the drawing head is controlled by a first electro-magnet. The downward movement of the drawing instrument is arrested by a stop provided at a lever held by a second electromagnet so that the drawing instrument is at an intermediate position spaced from a drawing plane by a small distance. The remaining distance is passed after a definite delay in that the lever is released by said second electromagnet so that the instrument contacts the drawing plane without any bouncing on and damage to said plane.

3 Claims, 1 Drawing Figure

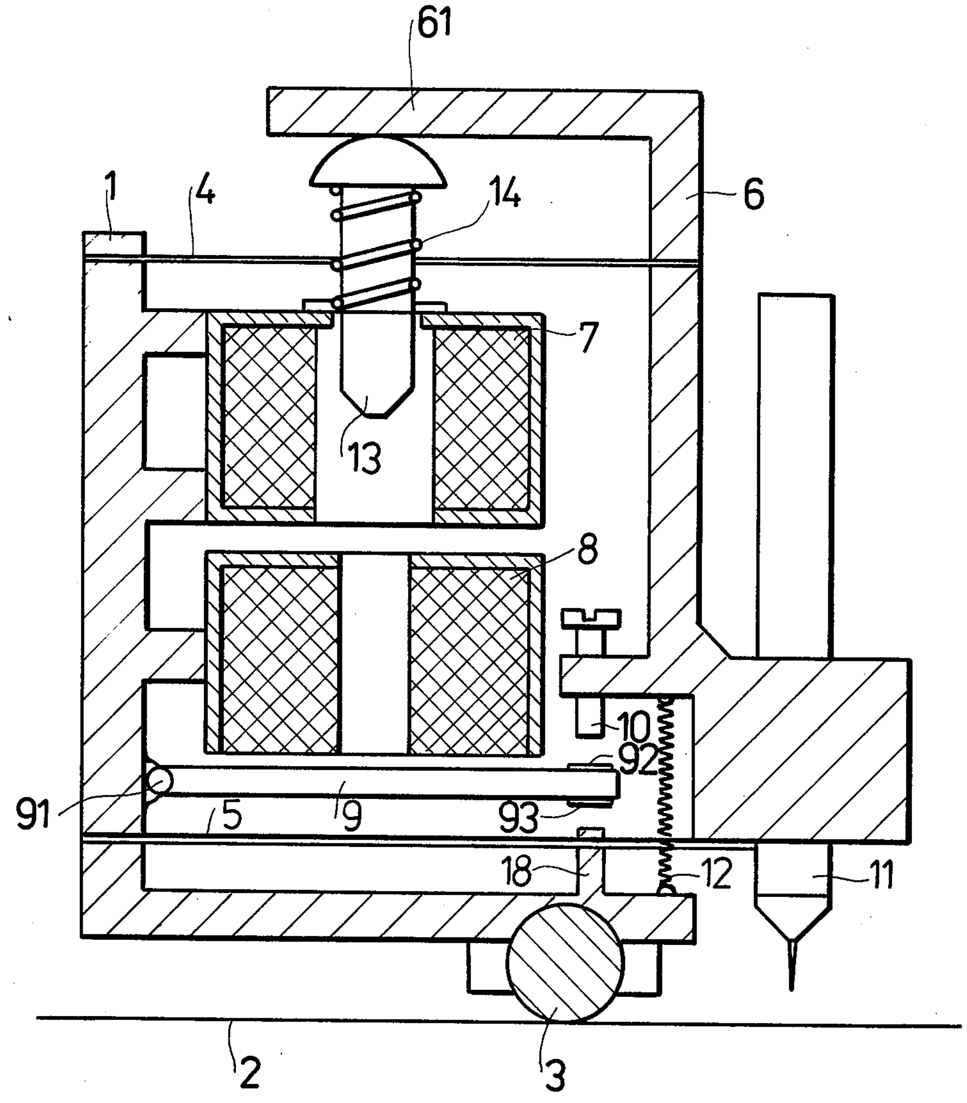
61
1
4
14
6
7
13
8
10
92
91
9
5
93
18
12
11
2
3

DAMPING MEANS FOR DRAWING HEADS

The invention relates to a damping means for drawing heads particularly for use in plotting devices for evaluating aerial photographs or in data handling output systems. The drawing head comprises a mount and a drawing instrument support which is resiliently hinged to the mount. The vertical movement of the drawing instrument is effected by means of an electromagnet.

In drawing heads the drawing instrument is lowered or raised by means of an electromagnet. In a previous device the drawing pen is connected to an iron part of a magnet and by magnetic forces between the latter and the magnet is pressed upon a map or the like under operation. In the course of lowering, the drawing pen is accelerated so that when contacting the drawing plane its speed has reached a maximum.

As a result thereof the drawing plane or the drawing instrument can suffer damages or the progress of the drawing instrument is stopped. It is also possible that the drawing instrument bounces uncontrolled which deteriorates the working or drawing quality.

To eliminate these disadvantages certain improvements have been suggested such as resilient means or air cushioning. The spring means brakes the drawing instrument movement shortly before the drawing plane.

This solution is disadvantageous since the drawing pressure upon the drawing plane is reduced and since, due to possible roughnesses of the drawing plane, a bouncing of the drawing instrument is not entirely eliminated.

Furthermore, an oscillation of the drawing instrument may occur when in the upper end position so that considerable time elapses between the individual drawing operations since it is not feasible to lower the drawing pen when still oscillating otherwise the same negative effects will occur as described hereinbefore when the drawing pen contacts the plane.

This involves a further disadvantage, both, with the spring means and with the air cushioning, namely, a reduction of the operation speed of the drawing head particularly, when pointed or dashed lines have to be produced.

In a further known device of the kind the drawing instrument is attached to a core moveably seated in the coil of the magnetic field of a permanent magnet.

The actual position, speed and accelerations of the drawing instrument are determined via a detector means, which serves to control the vertical movement of the drawing pen via a complicated electronic circuit which, in turn, controls the current flow through the coil.

This solution eliminates the bouncing of the drawing instrument and also increases the operation speed, however, it does require complicated opto-electronic components and electronic circuits.

It is an object of the invention to obviate the above disadvantages.

It is a further object of the invention to provide a simple electromechanical damping means for drawing heads which ensures a safe and even contact between the drawing instrument and the drawing plane, a considerably high operation speed of the device and a quick touch-down of the drawing instrument.

These and other objects are realised in a drawing head comprising a mount and a support for a drawing instrument resiliently connected to said mount, a first electromagnet for ensuring the vertical movement of the support and a second electromagnet.

The latter is provided with a tiltable lever and a stop for arresting the drawing instrument shortly before touching the drawing plane, and only releases said instrument for contacting the drawing plane after a period long enough to eliminate bouncing and oscillations of the drawing instrument.

It is a matter of choice to attach the first electromagnet to the support or to the mount.

It is further a matter of choice to provide the second magnet and the tilting lever at the mount and the stop at the support or to provide the stop at the mount and the second magnet and the tiltable lever at the support. Advantageously, both magnets and the tilting lever are provided at the mount and the stop at the support, thus the mass to be moved is considerably reduced, and hence, less force is necessary from the electromagnet. Furthermore, the oscillation behaviour of the support-mount-system is more suitable and the electrically contacting of the electromagnet is simplified. It is a further advantage when the stop for the tilting lever is adjustable so to cope with different widths of the drawing plane and with different lengths of the drawing instruments.

It is still a further advantage when the delay time effected by the tiltable lever is also adjustable.

In order that the invention may be more readily understood reference is made to the accompanying drawing which illustrates diagrammatically and by way of example one embodiment thereof and where the FIGURE shows a schematic view of the inventional drawing head including the damping means.

A mount 1 is displaceably arranged via a ball 3 in parallel to a drawing plane 2 by a suitable means (not shown).

A drawing instrument support 6 is resiliently connected to the mount 1 via two spring leaves 4, 5 which ensures a movement in one direction.

The support 6 carries a drawing instrument 11. Two electromagnets 7 and 8, the electrical connection lines being omitted for the sake of simplicity, are secured to the mount 1.

A tiltable lever 9 is hinged via a pivot 91 to the mount 1 and has two stop faces 92 and 93 at its free end portion.

The drawing instrument support is provided with an adjustable stop 10 in opposition to the stop face 92 of the free lever 9 end portion, and the mount 1 has a stop 18 in opposition to the stop face 93. The electromagnet 7 has a core 13 which acts with its upper end portion upon an arm 61 of an upper portion of the support 6. The vertical movement of the support 6 is controlled by the magnet 7 via said core 13 in cooperation with a retaining coil spring 14 which surrounds the portion of the core 13 projecting from out of the coil 8 and a retaining spring 12 connecting the lower portion of the drawing instrument support 6 and the mount 1.

In the start position, the drawing instrument support 6 is raised, that is, the drawing instrument 11 is remote from the drawing plane 2.

The magnet 7 is currentless whereas the magnet 8 is operated so that the lever 9 is attracted to the magnet 8. In operation, the magnet 7 is energised so that the core 13 is attracted into the coil of the magnet 7. The coil spring 7 simultaneously draws the support 6 towards the drawing plane 2 until arrested by the stop 10 contacting the stop face 92 of the free lever 9 end portion, thus defining a second, that is, an intermediate position.

The stop 10, for example, an adjustment screw, is so set that the drawing instrument 11 top carried by the support 6 is spaced apart from the drawing plane by about 0.05 to 0.1 mm.

After a definite period of time which is set by respective not shown electronic means the magnet 8 is rendered currentless so that the lever 9 is released and tilts by force of the spring 12 and the weight of the support 6 in counteraction to the spring 14 and guided by the leaf springs 4 and 5 towards the lower portion of the mount 1 where the lever stop face 93 is arrested at an end position stop 18, thus defining a third, namely, an end position.

Simultaneously the support 6 and hence the drawing instrument 11 move the remaining distance to the drawing plane 2 and contacts the latter without bouncing on and undesiredly intruding into the drawing plane 2. The raising of the drawing instrument 11 is effected in an opposite operation.

The magnet 7 is rendered currentless and the magnet 8 is energised.

The support 6 is subsequently reset into the first, the starting position by the force of the spring 14 in cooperation with the spring leaves 4, 5. The reset movement of the support is additionally effected by the lift of the lever 9 towards the stop 10. The magnets 7 and 8 are controlled by conventional electronic circuits which are omitted in the drawing for the sake of simplicity. The inventional solution is not restricted to the above embodiment.

It is feasible to keep the magnet 8 energised during the entire lift phase of the support 6. It is also feasible to have the magnet 8 currentless in said phase and only to operate the former when by energising the magnet 7 the support is lowered. This only requires to maintain the lever 9 in the upper end position when arresting the stop 10 and so to stop the support 6 before the drawing instrument 11 impinges upon the drawing plane 2.

It is further advantageous to embody the spring force of the spring 12 adjustable so to cope with varying and different types of drawing instruments and planes, respectively.

It is also feasible to employ a plurality of drawing instruments at one support which operate alternatively or commonly.

The drawing instruments referred to hereinbefore are understood as being fountain pens, fibers, plencils and the like, but also engraving tools, as they are required in map producing.

The invention is not restricted to the correlation and arrangement of the electromagnets 7, 8 and the core 13, respectively and of the lever 9 relative to the mount 1 and to the support 6. Each solution having the features of the above arrangement is in the sense of the invention when bouncing and oscillations of the drawing tool are eliminated.

We claim:

1. A damping means particularly for drawing heads comprising
- a mount,
- at least one support displaceable along one direction between a start position and an end position,
- at least one drawing instrument secured to said support,
- a first electromagnet being connected to said mount,
- a core being in common orientation with said first electromagnet for common operation,
  - said core being connected to said support,
- a second electromagnet being connected to said mount,
- a lever being pivotly connected with one end portion to said mount,
  - said lever being provided with at least one contact face at the other end portion,
  - said second electromagnet and said lever being aligned for common cooperation,
- a first stop being connected to said support,
  - said first stop and said contact face being aligned for common cooperation,
  - said first electromagnet and said core being for moving said support into an intermediate position,
  - said intermediate position being defined by said contact face and said first stop when said second electromagnet is operated,
- first spring means for resiliently securing said support to said mount,
- second spring means connecting said mount to said support for moving said support into an end position when said second electromagnet is not operative.

2. A damping means as claimed in claim 1, wherein a second stop is provided at said mount and a further stopping face at said lever being mutually aligned and for common operation and defining said end position.

3. Damping means as claimed in claim 1, wherein said first stop is adjustable in parallel to said direction.

* * * * *